April 19, 1966   H. J. KOZICKI   3,246,718
VEHICLE SUSPENSION SYSTEM
Original Filed June 25, 1963   2 Sheets-Sheet 1
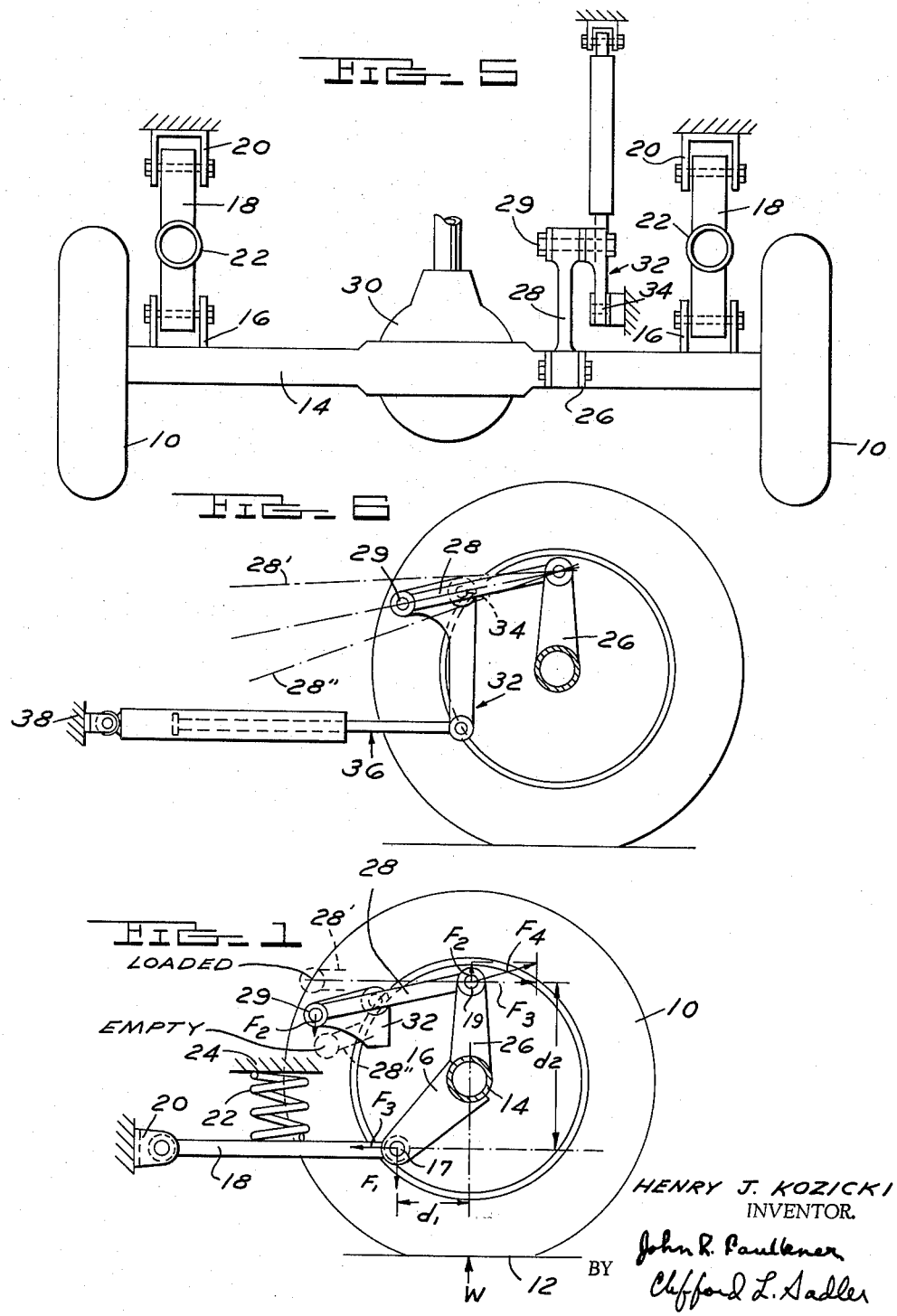
HENRY J. KOZICKI
INVENTOR.
BY John R. Paulkner
Clifford L. Sadler
ATTORNEYS April 19, 1966    H. J. KOZICKI    3,246,718
VEHICLE SUSPENSION SYSTEM
Original Filed June 25, 1963    2 Sheets-Sheet 2
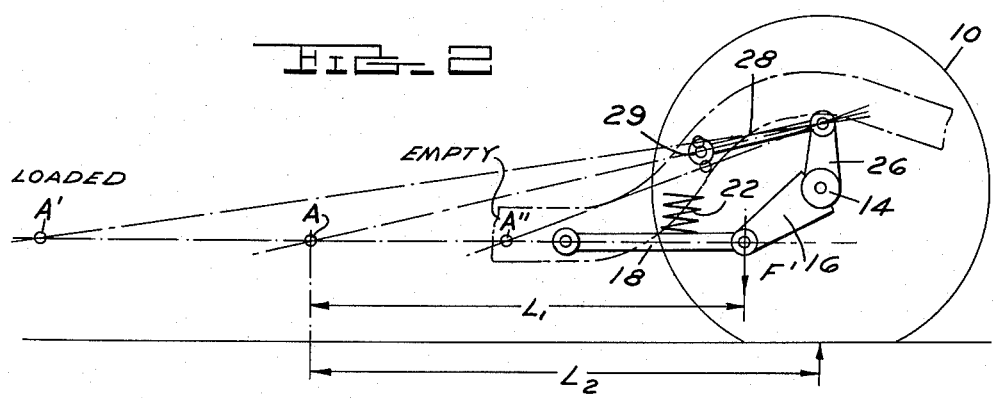
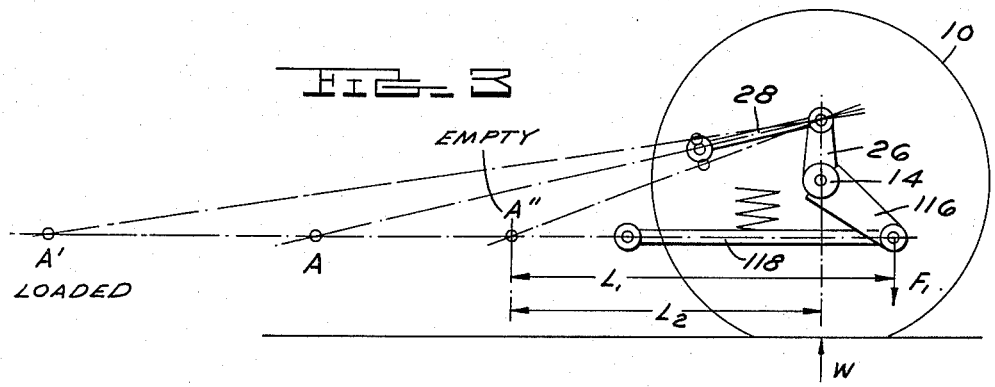
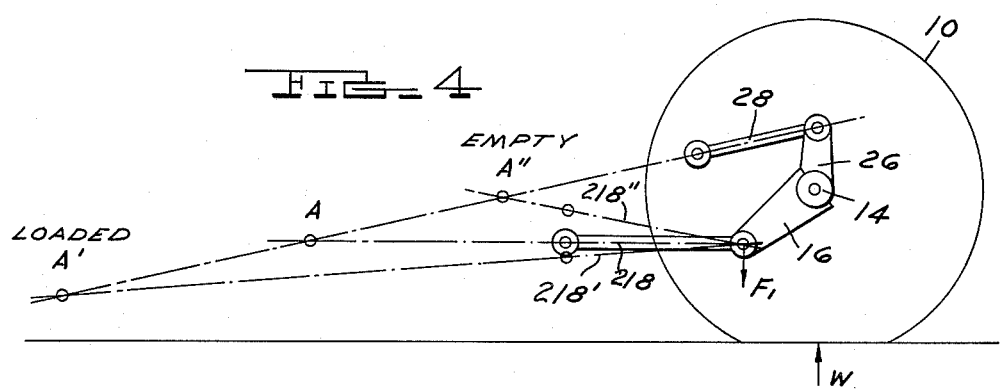
HENRY J KOZICKI
INVENTOR.
BY John R. Faulkner
Clifford L. Sadler
ATTORNEYS United States Patent Office 3,246,718
Patented Apr. 19, 1966

3,246,718
VEHICLE SUSPENSION SYSTEM
Henry J. Kozicki, Birmingham, Mich., assignor to Ford Motor Company, Dearborn, Mich., a corporation of Delaware
Continuation of abandoned application Ser. No. 290,483, June 25, 1963. This application Mar. 5, 1965, Ser. No. 446,758
7 Claims. (Cl. 180—73)

This invention relates generally to vehicle suspension systems and more particularly, to a suspension having means adapted to maintain the vehicle at a level attitude with respect to the ground regardless of changes in vehicle loading.

An examination of the prior art relating to vehicle suspension systems will disclose a large number of devices that are designed to compensate for changes in vehicle loading. In passenger cars having soft springing, devices that will return a vehicle to a level attitude upon the addition of passengers, luggage or other loads have been found to be highly desirable. A majority of these systems employ auxiliary springs, in addition to the main suspension springs, to support a portion of the vehicle sprung weight. To provide a load leveling or load compensating function, a mechanical actuating device is associated with the auxiliary springs and is adapted to increase or decrease the load carried by those springs in response to an increase or decrease of the loading upon the vehicle. It is customary in such systems to have the mechanical actuating device sensitive to car height and responsive to changes thereof in order to perform its leveling function.

Thus, in these conventional systems a regular suspension is provided for supporting the chassis and, in addition, an actuatable auxiliary suspension is provided to make height adjustments.

In accordance with the present invention, however, a vehicle suspension system is provided having compensating means to maintain a vehicle at a constant height without the use of auxiliary springs in the event of a change in sprung weight. More specifically, changes in vehicle loading are compensated for by making changes in the geometrical arrangement of the suspension linkage. In the conventional rear suspension system having a solid driving axle and a pair of coil springs, trailing arms are usually provided to position the axle. It has been discovered that the geometrical relationship between the various arms or links may be adjusted so as to change the effective forces exerted by the suspension springs in supporting the sprung weight. If adjustment means are provided as contemplated by the present invention, geometrical changes may be made that will alter the distribution of forces and the vehicle may be returned to its designed height after a change in loading.

It is one of the principal objects of the present invention, therefore, to provide a vehicle suspension system in which vehicle height is maintained at a designed level by alterations in the geometry of the suspension and without the employment of auxiliary spring devices.

More specifically, it is an object of the present invention to provide an embodiment in a vehicle having a solid rear axle and a pair of lower trailing arms joining the axle with the vehicle chassis. An upper arm connects the axle with the chassis and suspension springs are interposed between the lower arms and the chassis. An adjustable pivotal connection is interposed where the upper arm is connected to the chassis so that the angular relationship between the upper and lower arms may be readily modified to accommodate load changes.

The many objects and advantages of the present invention will become apparent from the following description and the accompanying drawings in which:

FIGURE 1 is a schematic side elevational view of a vehicle rear suspension incorporating an embodiment of the present invention;

FIGURE 2 is an elevational view corresponding to FIGURE 1 with a geometrical analysis of the suspension linkage;

FIGURE 3 is a schematic view corresponding to FIGURE 2 of an alternate construction of the present invention;

FIGURE 4 is a schematic view corresponding to FIGURE 2 of a still further modification of this invention;

FIGURE 5 is a top plan view of a rear suspension system incorporating the embodiment of the invention illustrated in FIGURES 1 and 2; and, FIGURE 6 is a side elevational view of the actuator portion of the suspension of FIGURE 5.

For a better understanding of the present invention, reference is now made to the drawings wherein like reference numerals identify like parts throughout the various views. In FIGURE 1, a wheel 10 resting upon the ground line 12 is disclosed. The wheel 10 is rotatably connected to an axle housing 14. A bracket 16 extends downwardly and forwardly of the axle 10 and is pivotally connected to a lower suspension arm 18. The forward end of the lower arm 18 is pivotally connected to a support 20 carried by the chassis or sprung mass of the vehicle. A coil type suspension spring 22 is disposed between a midpoint on the arm 18 and a spring seat 24 of the chassis.

A bracket 26 extends upwardly from the axle housing 14 and is pivotally connected to an upper suspension arm 28. Upper arm 28 extends forwardly from the bracket 26 and has a pivotal connection 29 with a chassis mounted support member 32. The support member 32 is adapted to readily move the location of pivot 29 so that the inclination of the arm 28 relative to the lower arm 18 may be varied.

This invention accomplishes the leveling of a vehicle after a load is added or removed by means of a geometrical change in the suspension linkage rather than by the loading or unloading of a leveling or auxiliary spring as in a conventional leveling type suspension system. An understanding of the present invention and its theory of operation can be obtained from an analysis of the forces which act upon the arms, the wheel, the axle housing, and the various pivots.

In FIGURE 1, the vehicle's weight is indicated by the arrow W. Arrow W is pointing upwardly as it represents the ground reaction. The spring 22, carrying the sprung weight of the vehicle, exerts a force $F_1$ upon the pivotal connection 17 between the lower arm 18 and bracket 16. Force $F_1$ does not equal force W because there is also an upward force $F_4$ upon the axle due to the inclination of the upper arm 28. Force $F_4$ results from the fact that forces $F_1$ and W act across the distance $d_1$ and thus create a couple that tends to make the axle housing 14 rotate in a counterclockwise manner as viewed in FIGURE 1. This couple is resisted by a clockwise couple consisting of the forces indicated by arrows $F_3$, acting across the distance $d_2$.

The arm 28 is freely pivoted at its ends and, therefore, can carry forces that act only along its longitudinal axis. For that reason, force $F_3$ is the horizontal component of force $F_4$ which is parallel to the axis of the upper arm 28. Force $F_4$ also has a vertical component $F_2$ situated at the pivotal connection 19 between the bracket 26 and the arm 28. A corresponding reaction force $F_2$ also appears at the inner pivot 29 where the arm 28 connects with the support 32.

It is, therefore, evident by summation of vertical forces (which must balance) that force $F_1$ equals force W plus force $F_2$.

According to the action-reaction principle, force $F_2$ appears at pivot 29 of the upper arm 28 in a direction tending to push the vehicle chassis down. The spring force $F_1$ is greater than the car's actual weight by an amount equal to force $F_2$.

If the loading of the vehicle is increased, the vehicle chassis will descend. In order to level the vehicle, the inclination of the upper link or arm 28 is shifted by mechanical means to the position indicated generally as 28'. If the arm 28 were in the horizontal position 28', as shown in the drawing, there would be no downward force $F_2$ on the vehicle and force $F_1$ would be equal to the new weight W. With the arm 28 horizontal, force $F_4$ would become force $F_3$ and there would be no vertical component $F_2$. The added load, in other words, took the place of the previous downward force $F_2$ with the result that the vehicle remains at the same height.

If the car had been made lighter by removing some of its load, the downward force $F_2$ could be increased to compensate for the load change by increasing the inclination of the upper arm 28 to the position 28''. The result would be restoration of the vehicle's level attitude.

In either case, it is contemplated that the inclination of arm 28 will be changed sufficiently to effect an increase or decrease in the magnitude of force $F_2$ equal to the change in vehicle loading that is being compensated for.

One mechanical means for positioning the inner pivot 29 of the upper arm 28 in order to effect proper arm inclination for vehicle leveling purposes is illustrated in FIGURES 5 and 6 and will be described later.

The theory of this invention can also be proven by the concept of instantaneous centers as shown in FIGURE 2. It can be shown that point A is the instantaneous center of the lower arm 18 and the upper arm 28 when the vehicle is at its designed height and carrying its designed load. (Point A is the imaginary point where the axes of arms 18 and 28 intersect.) According to the theory of instantaneous centers, the car weight W multiplied by its lever arm $L_2$ must equal the force $F_1$ times its lever arm $L_1$. Expressed mathematically, the formula is $F_1(L_1) = F_2(L_2)$. Both lever arms $L_1$ and $L_2$ are measured from the instantaneous center A.

To accommodate a change in load W, the relationship of $L_1$ and $L_2$ is adjusted by means of repositioning the inner pivot 29 in order to establish a new instantaneous center.

In the event the vehicle should have an increase in load, pivot 29 is raised so that the axes of the upper and lower arms 28 and 18 intersect at a new instantaneous center A'. By establishing the new instantaneous center A', the ratio of the lengths of lever arms $L_1$ and $L_2$ through which the forces $F_1$ and W act is changed so as to compensate for the increase in the vehicle's load or force W.

Instantaneous center A'' represents the inclination of the upper arm 28 to compensate for a decrease in vehicle loading. If the vehicle of FIGURE 2 has its load removed, then the suspension geometry must be changed to return it to its designed height. This is done by increasing the inclination of the upper arm 28 so that its axis intersects the axis of the lower arm 18 at an instantaneous center A''. Under these circumstances, the force $F_1$ will be operating through a shorter lever arm length $L_1$ to compensate for the decrease in the force W times its shorter lever arm $L_2$.

FIGURES 3 and 4 show alternate forms of the invention. In FIGURE 3, the axle housing bracket connected to the lower arm 118 extends downwardly and rearwardly as indicated by reference numeral 116. With this arrangement, the force $F_1$ is situated behind the axle 14. The same relationship of forces $[F(L_1) = W(L_2)]$ occurs with this construction except that the force in the upper arm 28 becomes a tensile load instead of a compressive load as in FIGURES 1 and 2. Point A represents the instantaneous center of the upper arm 28 and the lower arm 118 at designed loading. Point A' indicates the necessary position of the upper arm 28 in order to obtain the proper instantaneous center for returning the vehicle to a level attitude when it is under a heavily loaded condition.

Instantaneous center A'' corresponds to the inclination of the upper arm 28 when the vehicle carries less than its designed load. In FIGURE 3, distances $L_1$ and $L_2$ indicate the lever arm lengths through which the forces $F_1$ and W operate when the vehicle is in such an unloaded condition.

The basic idea behind the invention illustrated in FIGURES 2 and 3 is the alteration of the ratio between the lengths $L_1$ and $L_2$ by the relocation of the instantaneous center. In these embodiments, the change is effected by changing the inclination of the upper arm 28 by moving its forward pivot. The shift of the instantaneous center might also be accomplished by adjusting the inclination of the lower arm 218 as shown in FIGURE 4. In fact, both arms may be changed simultaneously if this is desired. As in the embodiments of FIGURES 2 and 3, point A' of FIGURE 4 indicates the necessary instantaneous center for a loaded condition and point A'' indicates the necessary instantaneous center for an unloaded condition. By shifting the inner pivot of the lower arm 218 to the loaded and unloaded positions 218' and 218'', respectively, a balance of forces and lever arm lengths may be achieved to maintain the vehicle at its designed height.

FIGURES 5 and 6 illustrate one possible mechanical arrangement for performing the invention illustrated in FIGURES 1 and 2. A similar arrangement would also be appropriate for the embodiments of FIGURES 3 and 4. In FIGURE 5, the rear wheels 10 are separated by an axle housing 14 which carries left and right lower brackets 16. The lower arms 18 extend forwardly from the brackets 16 and are pivotally connected to mounting brackets 20 that are secured to the chassis of the vehicle. Coil springs 22 are shown mounted on the arms 18.

The bracket 26 extends upwardly from the axle housing 14 off-center from the differential 30. The upper arm 28 is connected to the bracket 26 and extends forwardly therefrom. The forward end of the upper arm 28 is connected to one leg of a bell crank 32 by a pivot bolt 29. The bell crank 32 has its fulcrum 34 pivotally mounted on chassis structure. The bell crank 32 has its other leg extending downwardly and connected to a power strut 36 interposed between the end of the bell crank 32 and a chassis pivot 38.

With the foregoing structure, when the power strut 36 is actuated, the crank 32 pivots about its fulcrum point 34 causing its connection at 29 with the upper arm 28 to be displaced. The strut 36 may be either extended to lower the pivot point 29 and thereby increase the inclination of the arm 28 or it may be retracted to decrease the inclination of the arm 28. The strut is retracted to compensate for an increase in load and extended to compensate for a decrease in load. Reference numeral 28' indicates the axis of the upper arm 28 when adjusted for an increase in load and reference numeral 28'' indicates the position of the arm for a decrease in load.

A minimum amount of energy is required for the leveling operation. The energy stored in the coil spring 22 remains the same for either a heavy load or a light load because the height of the vehicle and consequently the length of coil spring 22 remains the same. The energy stored in a spring is a function of the spring rate and the amount of its static deflection and, therefore, it is apparent that the energy stored in a spring 22 is constant because its rate and amount of static deflection are constant. The only energy required to level then, is the amount necessary to break friction in the pivots and the amount needed to accomplish the physical task of relocating whatever pivots are utilized.

In place of the power strut 36, a cable running forward to a lever of some sort that the driver could physically operate would provide a manual leveling system. Since the power requirements are at a minimum in a constant energy suspension, this would require minimum driver effort.

The foregoing description presents the presently preferred embodiments and theory of operation of this invention. Alterations and modifications may occur to those skilled in the art that will come within the scope and spirit of the following claims.

I claim:

1. A vehicle suspension system having a wheel support member, a vehicle chassis structure, first and second suspension arms interconnecting said chassis structure and said wheel support member, said first arm having one end pivotally connected to said wheel support member at a point displaced from the center of said member and another end pivotally connected to said chassis structure, a suspension spring interposed between one of said arms and said chassis structure, said second arm having one end pivotally connected to said wheel support member at a point longitudinally displaced from the pivotal connection of said one end of said first arm, an intermediate member movably connected to said chassis structure, said second arm having another end pivotally connected to said intermediate member, power actuating means connected to said intermediate member and connected to said chassis structure and constructed to move said intermediate member and the other end of said second arm relative to said chassis structure from a first fixed static position to a second fixed static position whereby the geometrical relationship between said two suspension arms is changed.

2. The combination of claim 1 wherein said suspension spring is interposed between said first arm and said chassis structure.

3. A vehicle suspension system having a wheel support member, a vehicle chassis structure, lower and upper suspension arms interconnecting said frame and said wheel support member, a suspension spring interposed between said lower arm and said chassis frame, said lower and upper arms being arranged so that said spring normally imposes a load upon said upper arm under static conditions, said lower arm having one end pivotally connected to said wheel support member at a point displaced vertically and longitudinally from the center of said wheel support member, said lower arm having another end pivotally connected to said chassis structure, said upper arm being pivotally connected to said wheel support member at a point vertically displaced from the center of said wheel support member, said just mentioned point also being longitudinally and vertically displaced from the pivotal connection between the one end of said lower arm and said wheel support member, an intermediate member movably connected to said chassis frame, said upper arm having another end pivotally connected to said intermediate member, power actuating means connected to said intermediate member and connected to said chassis frame and constructed to move said intermediate member and its pivotal connection with said upper arm from a first fixed position to a second fixed position in order to effect a change in the geometrical relationship between said lower and upper suspension arms whereby the spring load imposed upon said upper arm is changed.

4. A vehicle suspension system having a wheel support member, a vehicle chassis structure, first and second suspension arms interconnecting said frame and said wheel support member, a suspension spring interposed between said first arm and said chassis frame, said first and second arms being arranged so that said spring normally imposes a load upon said second arm under static conditions, said first arm having one end pivotally connected to said wheel support member at a point displaced vertically and longitudinally from the center of said wheel support member, said first arm having another end pivotally connected to said chassis structure, said second arm being pivotally connected to said wheel support member at a point vertically displaced from the center of said wheel support member, said just mentioned point also being longitudinally and vertically displaced from the pivotal connection between the one end of said first arm and said wheel support member, an intermediate member movably connected to said chassis frame, said second arm having another end pivotally connected to said intermediate member, power actuating means connected to said intermediate member and connected to said chassis frame and constructed to move said intermediate member in its pivotal connection with said second arm from a first fixed position to a second fixed position in order to effect a change in the geometrical relationship between said first and second suspension arms whereby the spring load imposed upon said second arm is changed.

5. A vehicle suspension system having a wheel support member, a vehicle chassis structure, first and second suspension arms interconnecting said frame and said wheel support member, a suspension spring interposed between said first arm and said chassis frame, said first and second arms being arranged so that said spring normally imposes a load upon said second arm under static conditions, said first arm having one end pivotally connected to said wheel support member, said first arm having another end pivotally connected to said chassis structure, said second arm being pivotally connected to said wheel support member at a point longitudinally and vertically displaced from the pivotal connection between the one end of said first arm and said wheel support member, an intermediate member movably connected to said chassis frame, said second arm having another end pivotally connected to said intermediate member, power actuating means connected to said intermediate member and connected to said chassis frame and constructed to move said intermediate member and its pivotal connection with said second arm from a first fixed position to a second fixed position in order to effect a change in the geometrical relationship between said first and second suspension arms whereby the spring load imposed upon said second arm is changed.

6. A vehicle suspension system having a wheel support member, a vehicle chassis structure, first and second suspension arms interconnecting said frame and said wheel support member, a suspension spring interposed between one of said arms and said chassis frame, said first and second arms being arranged so that said spring normally imposes a load upon the other of said arms under static conditions, said first arm having one end pivotally connected to said wheel support member, said first arm having another end pivotally connected to said chassis structure, said second arm being pivotally connected to said wheel support member at a point longitudinally and vertically displaced from the pivotal connection between the one end of said first arm and said wheel support member, an intermediate member movably connected to said chassis frame, said second arm having another end pivotally connected to said intermediate member, power actuating means connected to said intermediate member and connected to said chassis frame and constructed to move said intermediate member and its pivotal connection with said second arm from a first fixed position to a second fixed position in order to effect a change in the geometrical relationship between said suspension arms whereby the spring load imposed upon said other arm is changed.

7. A motor vehicle having a pair of driving wheels, a rigid axle housing interposed between said wheels and rotatably supporting said wheels, a chassis frame, a pair of lower suspension arms each having one end pivotally connected to said frame and the other end pivotally connected to said axle housing, a suspension spring interposed between each of said arms and said frame, an upper suspension arm pivotally connected at one of its ends to said axle housing by means providing a pivot axis offset from the center of said axle housing, a power actuatable device operatively interconnecting the other end of said upper arm and said frame, said device being constructed to move said other end of said upper arm along a fixed path from a first static position to a second static position with respect to said frame in order to effect a change in the geometrical relationship between said upper arm and said lower arms, said lower arms being each pivotally connected to said axle housing by a pivot bracket having its pivot support axis displaced downwardly and longitudinally from the center of said axle housing and from the connection between said upper suspension arm and said axle housing.

References Cited by the Examiner
UNITED STATES PATENTS

| | | | |
|---|---|---|---|
| 2,998,265 | 8/1961 | Kozicki | 280—124 |
| 3,163,440 | 12/1964 | Vail | 280—124 X |
| 3,175,836 | 3/1965 | Mather | 180—73 X |

BENJAMIN HERSH, *Primary Examiner.*

E. E. PORTER, *Assistant Examiner.*